United States Patent [19]

Hauser

[11] 4,274,248
[45] Jun. 23, 1981

[54] HAY HARVESTING MACHINE

[75] Inventor: Hans-Ulrich Hauser, Niederweningen, Switzerland

[73] Assignee: Bucher-Guyer AG Maschinenfabrik, Niederweningen, Switzerland

[21] Appl. No.: 94,966

[22] Filed: Nov. 16, 1979

[30] Foreign Application Priority Data

Nov. 21, 1978 [CH] Switzerland ............ 11902/78

[51] Int. Cl.³ ............................................. A01D 79/00
[52] U.S. Cl. ............................................. 56/370
[58] Field of Search ................. 56/370, 192, 366, 377

[56] References Cited

U.S. PATENT DOCUMENTS

| 3,820,314 | 6/1974 | Reber | 56/370 |
|---|---|---|---|
| 4,059,944 | 11/1977 | Reber | 56/370 |

Primary Examiner—Jay N. Eskovitz
Attorney, Agent, or Firm—Werner W. Kleeman

[57] ABSTRACT

A hay harvesting machine contains a rake wheel whose housing is formed by an upper housing portion non-rotatably connected with a vertical upright shaft and a lower driven housing portion rotatably mounted at such upright shaft. In bearing bushings rotatably mounted at the lower housing portion there are retained tine supports provided with raking tines or prongs. These tine supports extend in an essentially horizontal plane and, by rotating the bearing portions, can be selectively shifted from a first operating position into a second operating position. In the first operating position the tine supports extend approximately in tangential direction and in the second operation position they protrude essentially in radial direction from the upright shaft. Each tine support is connected with a control lever engaging, by means of a control head or follower, into a control track or cam. This control track is located in a plane extending essentially perpendicular to the upright shaft, i.e. horizontally. Each control lever is connected with the related tine support by means of a hinge shaft extending approximately perpendicular to the lengthwise axis of the related tine support and located in a plane which is essentially perpendicular to the upright shaft. By virtue of this hinge connection, with the tine supports located in the second operating position, there is eliminated the control connection between the control lever and its tine support.

15 Claims, 4 Drawing Figures

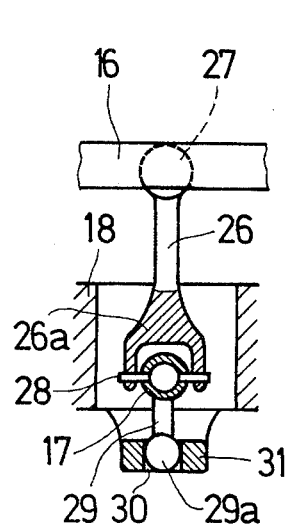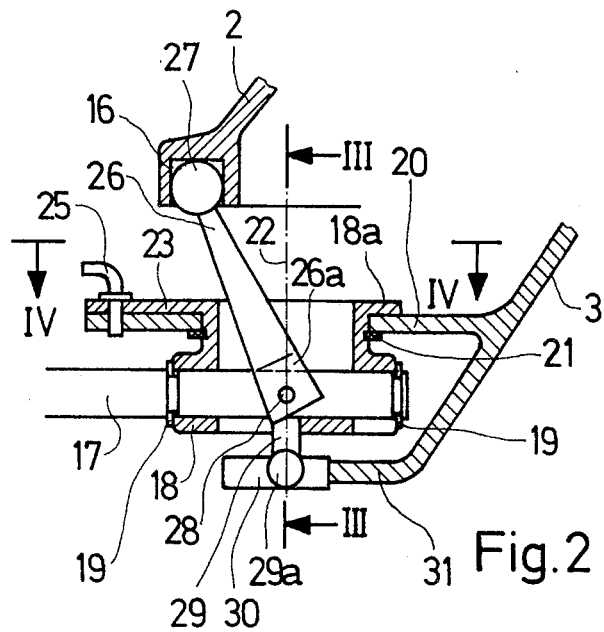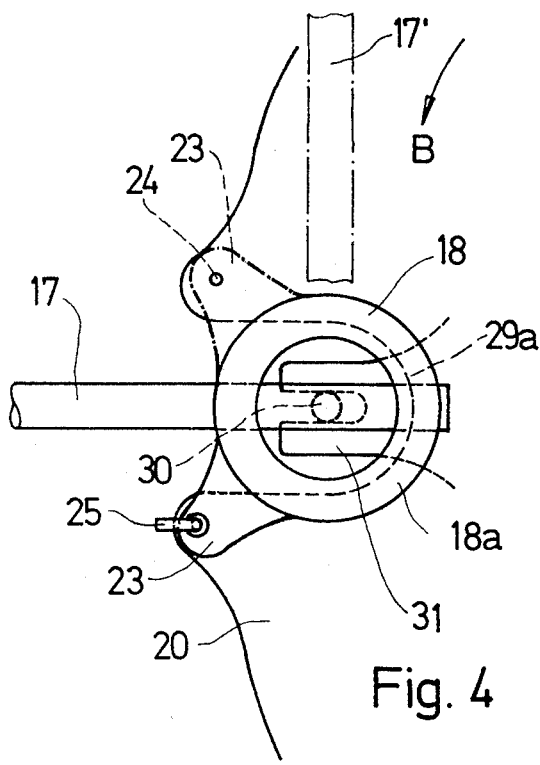

HAY HARVESTING MACHINE

CROSS-REFERENCE TO RELATED CASES

This application is related to my commonly assigned copending U.S. Pat. application No. 094,968, filed Nov. 16, 1979, entitled "Hay Harvesting Machine", and my commonly assigned, copending U.S. application Ser. No. 094,967, filed Nov. 16, 1979, entitled "Hay Harvesting Machine".

BACKGROUND OF THE INVENTION

The present invention relates to a new and improved construction of a hay harvesting machine.

Generally speaking, the hay harvesting machine of the present development is of the type comprising at least one rake wheel revolving about a substantially vertical or upright shaft and contains a driven rotatable housing part or portion rotatably mounted upon the upright shaft. At the rotatable housing portion there are mounted a plurality of tine supports equipped with rake tines or prongs. The tine supports can be selectively brought into each of two operating positions by rotation thereof about an axis extending transversely with respect to their lengthwise axis and approximately parallel to the upright shaft. The tine supports are connected by means of a hinge connection with a control element which continuously engages with a control track or cam which is non-rotatably mounted at the upright shaft. In the first operating position of the tine supports there can be established a control connection by blocking the hinge connection between the control element and the tine supports. This control connection brings about pivoting or rocking of the tine supports about their lengthwise axis during their revolving motion. In the second operating position no control connection exists, in that there is released the hinge connection between the control element and the tine supports, and the tine supports are now secured against rocking or pivoting about their lengthwise axis.

A similar type of hay harvesting machine is known from German Patent Publication No. 2,619,867 and the corresponding U.S. Pat. No. 4,059,944, wherein the control elements, hingedly coupled with the tine supports, are guided in a control cam or track. This control track extends at the same spacing about the upright shaft and possesses, in the direction of the upright shaft, an ascending and again descending portion or section for raising the rake tines during swath formation. Due to the space required by the control track or cam in the direction of the upright shaft, it is therefore necessary to correspondingly increase the structural height of the machine, and thus also its weight. This increased weight of the equipment requires a corresponding design and dimensioning thereof. Due to the relatively large structural height the use of the machine at the region of hedges, bushes and trees having low slung branches is rendered more difficult, if not made impossible.

SUMMARY OF THE INVENTION

Therefore, with the foregoing in mind it is a primary object of the present invention to provide a new and improved construction of a hay harvesting machine which is not afflicted with the aforementioned drawbacks and limitations of the prior art proposal discussed above.

Another and more specific object of the present invention is directed to a new and improved construction of hay harvesting machine designed such that it is subjected to lesser wear and has as low as possible structural height and weight.

Still a further significant object of the present invention is directed to a new and improved construction of hay harvesting machine of the previously mentioned type which is relatively simple in design, economical to manufacture, extremely reliable in operation, not readily subject to breakdown or malfunction, and requires a minimum of maintenance and servicing.

Now in order to implement these and still further objects of the invention, which will become more readily apparent as the description proceeds, the hay harvesting machine of the present development is manifested by the features that the control track or cam extends in a plane which is disposed essentially perpendicular to the upright shaft.

Since the control track or cam is located in a plane which extends at least approximately perpendicular to the upright shaft, the control track only has an insignificant effect upon the structural height of the machine. The tine supports, which can revolve in a plane which is essentially parallel to the plane of the control track or cam, can be secured in a most simple manner, in their second operating position, against pivoting or rocking about their lengthwise axis.

The control track is preferably arranged above the tine supports, rendering possible a compact construction of the machine.

It is furthermore of advantage if, with a hay harvesting machine whose tine supports extend rearwardly, viewed with respect to the direction of rotation, in the first operating position, that the control track or cam is constructed such that it has a first track section or portion arranged essentially coaxially with respect to the upright shaft and a second track section or portion which, in relation to the first track portion, extends at a greater spacing from the upright shaft. Due to this design of the control track the control elements of the tine supports, during their revolving motion along the control track, are only subjected to gradual directional changes and are not forced to undergo any direction reversals or pronounced deflections. In this way it is possible to effectively reduce the wear experienced by the control track and the control elements.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 is a vertical sectional view, on an enlarged scale in relation to the showing of FIG. 1, of the region of a tine support-bearing or support arrangement;

FIG. 3 is a cross-sectional view of the arrangement of FIG. 2, taken substantially along the line III—III thereof; and FIG. 4 is a cross-sectional view of the arrangement of FIG. 2, taken substantially along the line IV—IV thereof.

DETAILED DESCRIPTION OF THE PREFERRED EMBODIMENTS

Figure 1:
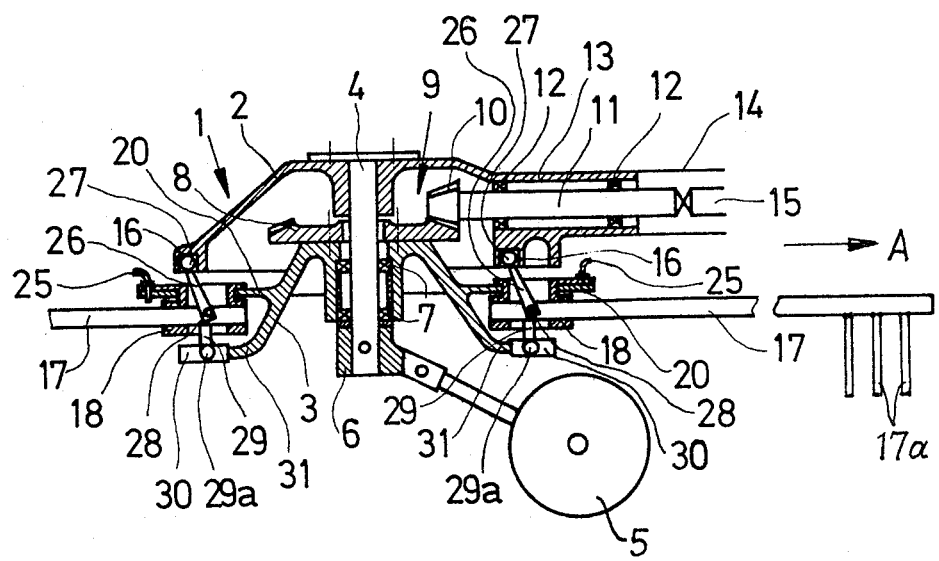
FIG. 1 is a vertical sectional view through the rake wheel of a hay harvesting machine according to the invention.

Describing now the drawings, and as particularly recognized by referring to FIG. 1, there is shown therein the rake wheel of a hay harvesting machine according to an exemplary embodiment of the invention and which comprises a housing 1. This housing 1 is formed by an upper, substantially bowl-shaped and downwardly open housing portion or part 2 and a lower housing portion or part 3. The upper housing portion 2 is non-rotatably connected with an upright, approximately vertical shaft 4 in any suitable manner, for instance by means of threaded bolts or screws or other equivalent fastening expedients. This upright shaft 4 bears upon the ground by means of a support wheel 5. The support wheel 5 is mounted by a hub portion 6 at the lower end of the upright shaft 4. The lower housing portion 3 is rotatably mounted by means of ball bearings 7 or equivalent structure at the upright shaft 4. The rotatable lower housing portion 3 is driven to revolve or orbit in the direction of the arrow B (FIG. 4) in counterclockwise sense. For this purpose there is secured to the lower housing portion 3 a suitable drive arrangement, here in the form of drive gearing, and specifically a bevel gear 8 of a bevel gear drive 9. This bevel gear 8 also can be formed of one-piece with the lower housing portion 3. Meshing with the bevel gear 8 is a second bevel gear 10 which is seated upon a drive shaft 11. This drive shaft 11 is rotatably mounted by means of ball bearings 12 in a substantially channel-shaped connection element or piece 13 of the upper housing portion 2.

The described rake wheel can be connected by means of this connection piece or element 13 with a suitable coupling element 14 of a not particularly illustrated but standard traction vehicle, typically for instance a tractor. This traction vehicle pulls the rake wheel in the direction of the arrow A of FIG. 1. The drive shaft 11 is coupled with the power take-off shaft 15 of the traction vehicle, so that the lower housing portion 3 can be revolvingly driven in conventional fashion by the traction vehicle.

The upper housing portion 2 is provided at its underside with a closed or endless control track or cam 16 which extends along the circumference thereof. The purpose of this control track or cam 16 will be explained more fully hereinafter. At this point it is remarked that the control track 16 is located in a plane which is dispositioned essentially perpendicular to the upright shaft 4, i.e. approximately in a horizontal plane. As best seen by reverting to FIGS. 1 and 2, the control track or cam 16 may be formed by a downwardly open, substantially U-shaped sectional or profile element. This control track or cam 16 possesses a first track section or portion which extends essentially coaxially with respect to the upright shaft 4 and which merges with a second track section or portion arranged at a greater spacing from the upright shaft 4 than the aforementioned first track section or portion. By virtue of the second track portion of section the control track or cam 16 has imparted thereto a bowed-out configuration, as the same has been disclosed in greater detail in both the aforementioned U.S. applications Ser. No. 094,968, filed Nov. 16, 1979, entitled "Hay Harvesting Machine" and U.S. application Ser. No. 094,967, filed Nov. 16, 1979, entitled "Hay Harvesting Machine".

Along the circumference of the lower, driven housing portion 3 there are arranged at a mutual spacing from one another a number of tine supports or support members 17, each carrying at their free ends suitable conventionally constructed rake tines 17a, only few of which have been schematically illustrated in the drawing of FIG. 1 at the right-hand portion thereof, since details of their construction are unimportant for understanding the basic principles of the invention. In practice there are provided typically, for instance six or eight tine supports 17. Each tine support 17 is pivotably mounted at its end, facing away from the rake tines or prongs 17a, in a bearing bushing 18 for pivotable movement about its lengthwise axis. Securing rings 19 or equivalent structure, best seen by referring to FIG. 2, prevent any displacement of the tine supports 17 in their lengthwise direction. The bearing bushings 18 are retained at a ring or annular flange 20, constituting part of the lower housing portion 3 and located in a plane which is dispositioned approximately perpendicular to the upright shaft 4. These bearing bushings 18 bear by means of a flange 18a upon the ring-shaped housing flange 20 and are secured at the side opposite the flange 18a by means of a securing ring 21 or equivalent structure. The bearing bushings 18 can be selectively rotated between two end or terminal positions in the ring-shaped flange 20 about an axis 22 extending approximately parallel to the upright shaft 4. In order to secure the bearing bushings 18 in each of these end or terminal positions the bearing bushings or sleeves 18 are each provided with a protuberance or projection 23 having a hole or aperture 24 which, in each terminal position, is placed into alignment with a corresponding hole or aperture 24 provided at the ring-shaped flange 20, as best seen by referring to FIG. 4. Inserted into these aligned holes 24 is a securing or fixing bolt 25 or equivalent structure, thus preventing any undesired rotation of the bearing bushings 18.

In the one terminal position, shown in phantom lines in FIG. 4, the tine supports 17 assume a first operating position which, in the illustration of such FIG. 4, has been shown by the phantom line depicted tine support generally designated by reference character 17'. In this first operating position the tine supports 17 extend approximately tangentially with respect to the revolving path of travel of the bearing bushings 18 and, in the direction of rotation B, extend rearwardly. In the other terminal or end position of the bearing bushings 18, shown in FIGS. 1 to 4, the tine supports 17 assume a second operating position where they extend approximately in radial direction away from the upright shaft 4. The functions of the tine supports 17 associated with both of these operating positions will be described more fully hereinafter.

Continuing, each tine support 17 is connected with a control element 26, here shown as a control lever, carrying at its free end a control head or follower 27 which engages into the control track or cam 16. This control lever 26 straddles laterally, by means of its forked or bifurcated end 26a, the related tine support 17, as best seen by referring to FIG. 3. By means of a pivot shaft 28, shown in FIG. 3 as formed of two parts, the bifurcated end 26a of the control arm or lever 26 is connected with the tine support 17. This pivot shaft 28, as best seen by referring to FIGS. 1 to 3, extends approximately perpendicular to the lengthwise axis of the related tine support 17 and is located in a plane which extends essentially perpendicular to the upright shaft 4.

At the underside of each tine support 17 there is mounted an arresting element 29 which extends along the rotational axis 22 of the bearing bushings 18 and engages by means of its head 28a in a longitudinal or lengthwise extending slot 30 provided at a projection or extension 31 of the lower housing portion 3. This longitudinal slot 30 extends approximately in radial direction in a plane which is essentially perpendicular to the upright shaft 4. The lengthwise extent of this slot 30 thus coincides with the direction which the tine supports 17 assume when occupying their second operating position.

Continuing, now for swathing the tine supports 17 are brought into the first operating position by means of the bearing bushings 18 as already described and shown in phantom lines in FIG. 4. In this first operating position the hinge connection formed by the pivot shaft 28 is blocked, i.e. a control connection exists between the tine supports 17 and the control levers or arms 26. The movement imparted to the control levers 26 by the action of the control track or cam 16 is transmitted to the tine supports 17, so that such can perform a pivotal movement about their related lengthwise axis. As long as the control lever 26 together with its control head or follower 27, during the revolving movement of the related tine support 17, are guided in the circular-shaped portion or section of the control track 16, the corresponding tine supports 17 are rocked into their raking position where the rake tines 17a assume an essentially vertical position directed downwardly towards the ground. The cut material which is reposing upon the ground is raked together in known manner into a swath by the rake tines 17a located in their rake position.

If the control arms or levers 26 arrive at the region of the bowed-out control cam or track section, then there is accomplished a rocking or pivoting of the tine supports 17, with the result that the rake tines 17a are raised from the ground and upwardly rocked or pivoted. In this upwardly pivoted position, where the rake tines 40 extend opposite to the direction of rotation B, these rake tines are out of engagement with the previously formed swath. During the passage of the control arms 26 through the bowed-out control track section or portion there occurs a gradual return pivoting of the tine supports 17 into their raking position, into which they are finally pivoted as soon as they again arrive at the region of the circular-shaped control track section. As to further details of the mode of operation of the hay harvesting machine, during the swath formation, reference may be had to both of my aforementioned U.S. applications Ser. Nos. 094,967 and 094,968, to which reference may be readily had and the disclosure of which is incorporated herein by reference.

Since the lengthwise slot 30, with the tine supports 17 located in the first operating position, are disposed in a plane which extends perpendicular to the lengthwise axis of the tine supports 17, the arresting device 29, during rocking of the tine supports 17 about their lengthwise axis, can freely move in the longitudinal or lengthwise slot 30, so that this arresting device 29 does not influence in any way such pivoting or rocking motion.

By rotating the bearing bushings 18 about the rotational axis 22 the tine supports 17 are rotated into their second operating position, where, as already mentioned, they extend in radial direction. During this re-positioning of the tine supports 17 both the control head or follower 27 as well as also the head 29a of the arresting device 29 remain in engagement with the control track 16 and the lengthwise slot 30, respectively. In the second operating position, where the tine supports 17 serve for windrowing and turning the cut material or legume, the hinge connection between the tine supports 17 and the control levers 26 is effective. When revolvingly driving the lower housing portion 3 the control lever or arm 26, guided by means of its control head or follower 27 in the control track or cam 16, can oscillate about the hinge or pivot shaft 28. Between the control levers 26 and the tine supports 17 there thus does not prevail any control connection, so that the control track 16 is without influence upon the movement of the tine supports 17. These tine supports 17 are secured against a pivoting about their lengthwise axis by means of the arresting device or element 29 which is guided by its head 29a in the longitudinal or lengthwise slot 30. During the revolving movement of the tine supports 17 such are thus fixedly retained in their position where the rake tines or prongs 17a are directed approximately vertically downwards. The upright shaft is inclined in known manner such that the tips of the rake tines revolve, in the direction of travel, in a plane which is inclined forwardly and downwardly.

As to the functions, i.e. the selective swathing or windrowing and turning, respectively, it is here to be remarked that the previously described hay harvesting machine is comparable to the hay harvesting machine described in the aforementioned copending U.S. application Ser. No. 094,967, filed Nov. 16, 1979. In contrast to the hay harvesting machine of that application here the control lever 26 together with its control head or follower 27 always remains in engagement with the control track or cam 16, i.e. also during windrowing and turning.

It is also conceivable to secure the tine supports 17, located in their second operating position, against pivoting about their lengthwise axis in a manner different than that illustrated and described. The illustrated exemplary embodiment utilizing the arresting device 29 and the lengthwise slot 30 does however have the advantage that for securing against such rocking or pivoting, apart from rotating the bearing bushings 18, no additional manual operations or manipulations are necessary.

Instead of using a substantially U-shaped sectional or profile element for forming the control track or cam 16 it is also possible to employ a substantially L-shaped sectional or profile element which is downwardly open and to one side. If there is used an outwardly open L-shaped sectional element, then the control arms or levers must be biased, for instance by spring force, against the inner surface of the downwardly extending leg of the sectional element. The lower housing portion 3 can also have the configuration of a downwardly open spoke wheel, wherein the tine supports 17 then are secured at the spoke arms of the spoke wheel.

The conversion or re-positioning of the tine supports 17 from the first operating position into the second operating position, and vice-versa, also can be accomplished in a different manner than described. Advantageously, the re-positioning equipment can be structured that with one manipulation all of the tine supports 17 can be simultaneously re-positioned in the other operating position and locked in this operating position.

In practice there are advantageously employed two or more rake wheels of the previously described type which are arranged next to one another. With this arrangement the rake wheels can be driven so as to rotate in the same directional sense or in pairs so as to rotate in opposite directional senses.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A hay harvesting machine comprising:
   at least one rake wheel rotatable about a substantially vertical axis;
   said rake wheel comprising:
     a substantially upright shaft defining said vertical axis;
     a housing containing a driven rotatable housing portion;
     means for rotatably mounting said rotatable housing portion upon said upright shaft;
     a plurality of tine supports, each having a lengthwise axis;
     each of said tine supports being selectively movable between two operating positions by rotation of the tine support about an axis extending transversely with respect to its lengthwise axis and approximately parallel with respect to the upright shaft;
     a control element provided for each tine support;
     hinge connection means for connecting each tine support with its control element;
     control track means non-rotatably connected with said upright shaft;
   each of the control elements being continuously in engagement with the control track means;
     said two operating positions defining a first operating position and a second operating position;
     a control connection prevailing between the control element and the related tine support in the first operating position by blocking the hinge connection means;
     said control connection causing pivoting of the tine support about its lengthwise axis during its revolving motion;
     in the second operating position no control connection prevailing between the control element and the tine support by releasing the hinge connection means and the tine supports being secured against pivoting about their lengthwise axis; and
     said control track means extending in a plane disposed essentially perpendicular to the upright shaft.

2. The hay harvesting machine as defind in claim 1, wherein:
   said control track means is arranged above said tine supports.

3. The hay harvesting machine as defined in claim 2, wherein:
   said tine supports are directed rearwardly in their first operating position with respect to the direction of revolving motion;
   said control track means comprising a first track section arranged essentially coaxially with respect to the upright shaft and a second track section which, in relation to the first track section, extends at a greater spacing from the upright shaft.

4. The hay harvesting machine as defined in claim 3, wherein:
   said control track means comprises a downwardly open substantially U-shaped sectional member.

5. The hay harvesting machine as defined in claim 3, wherein:
   said control track means comprises a substantially L-shaped sectional member which is downwardly open and open to one side.

6. The hay harvesting machine as defined in claim 2, wherein:
   said control track means comprises a downwardly open substantially U-shaped sectional member.

7. The hay harvesting machine as defined in claim 2, wherein:
   said control track means comprises a substantially L-shaped sectional member which is downwardly open and open to one side.

8. The hay harvesting machine as defined in claim 1, wherein:
   said hinge connection means comprises a hinge shaft interconnecting the control element and the related tine support; and
   said hinge shaft extending approximately perpendicular to the lengthwise axis of the related tine support and being located in a plane which is essentially horizontal with respect to the upright shaft.

9. The hay harvesting machine as defined in claim 8, wherein:
   the control element comprises a control lever having a forked end;
   said forked end laterally engaging the related tine support; and
   the forked end being connected by means of the hinge shaft with the related tine support.

10. The hay harvesting machine as defined in claim 1, further including:
   a bearing bushing for mounting each tine support;
   said bearing bushing being rotatably arranged at the rotatable housing portion for rotation about a rotational axis which extends essentially parallel to the upright shaft and is disposed approximately perpendicular to the lengthwise axis of the related tine support.

11. The hay harvesting machine as defined in claim 1, further including:
   an arresting device arranged at each tine support and extending transversely with respect to its lengthwise axis;
   said arresting device, with the tine support located in its second operating position, fixedly retaining such tine support to prevent any pivoting thereof about its lengthwise axis and freeing the tine support in the first operating position.

12. The hay harvesting machine as defined in claim 11, wherein:
   said rotatable housing portion being provided with a longitudinal slot;
   said arresting device extending along the axis of rotation of the tine support and engaging with said longitudinal slot; and
   said longitudinal slot extending in the direction of the tine support when located in the second operating position.

13. The hay harvesting machine as defined in claim 1, wherein:

the rotational angle for shifting the tine support from the first operating position into the second operating position amounts to about 90°.

14. The hay harvesting machine as defined in claim 11, wherein:
the tine supports when in their first operating position extend in an approximately tangential direction and in their second operating position extend in approximately radial direction with respect to the upright shaft.

15. A hay harvesting machine comprising:
at least one rake wheel rotatable about a substantially vertical axis;
said rake wheel comprising:
a substantially upright shaft defining said vertical axis;
a housing containing a driven rotatable housing portion;
means for rotatably mounting said rotatable housing portion upon said upright shaft;
a plurality of tine supports, each having a lengthwise axis and carrying rake tines;
means for enabling each of said tine supports to be selectively movable between two operating positions by rotation of the tine support about an axis extending transversely with respect to its lengthwise axis and approximately parallel with respect to the upright shaft;
a control element provided for each tine support;
hinge connection means for connecting each tine support with its control element;
control track means connected with said upright shaft;
each of the control elements being continuously in engagement with the control track means;
said two operating positions defining a first operating position and a second operating position;
means for establishing a control connection between the control element and the related tine support in the first operating position by blocking the hinge connection means;
said control connection enabling pivoting of the tine support about its lengthwise axis during its revolving motion;
said means for establishing said control connection being structured such that in the second operating position of the tine supports no control connection prevails any longer between the control element and the tine support by releasing the hinge connection means and the tine supports being secured against pivoting about their lengthwise axis; and
said control track means extending in a plane disposed essentially perpendicular to the upright shaft.

* * * * *